United States Patent
Candy (10) Patent No.: US 10,078,148 B2
(45) Date of Patent: Sep. 18, 2018

(54) METAL DETECTOR

(71) Applicant: Minelab Electronics Pty Limited, Torrensville (AU)

(72) Inventor: Bruce Halcro Candy, Torrensville (AU)

(73) Assignee: Minelab Electronics Pty Limited, South Australia (AU)

( * ) Notice: Subject to any disclaimer, the term of this patent is extended or adjusted under 35 U.S.C. 154(b) by 418 days.

(21) Appl. No.: 14/553,273

(22) Filed: Nov. 25, 2014

(65) Prior Publication Data

US 2015/0145517 A1 May 28, 2015

(30) Foreign Application Priority Data

Nov. 26, 2013 (AU) .................................. 2013904566

(51) Int. Cl.
*G01V 1/00* (2006.01)
*G01V 3/10* (2006.01)

(52) U.S. Cl.
CPC ...................................... *G01V 3/10* (2013.01)

(58) Field of Classification Search
CPC . G01V 3/15; G01V 3/104; G01V 3/02; G01V 3/10; G01V 3/26; G01V 5/04; G01V 3/081; G01V 3/088; G01V 3/12; G01V 3/165; G01S 13/885; G01S 13/888; G01S 3/14; G01S 3/46; G01S 13/34; G01S 13/426; G01R 23/20; G01R 27/2617; G01R 29/26; G01R 27/02; G01R 29/085; G01R 31/08; G01R 31/083; G01R 31/2812
See application file for complete search history.

(56) References Cited

U.S. PATENT DOCUMENTS

| 6,967,574 B1 * | 11/2005 | Nelson | F41H 11/136 |
| | | | 324/228 |
| 7,310,060 B2 * | 12/2007 | Stilwell | G01V 3/15 |
| | | | 324/326 |
| 2006/0194327 A1 * | 8/2006 | Kahlan | G01N 15/0656 |
| | | | 436/86 |

(Continued)

FOREIGN PATENT DOCUMENTS

| AU | 2011200515 A1 | 3/2011 |
| AU | 2011200516 A1 | 3/2011 |
| WO | 2014172751 A1 | 10/2014 |

*Primary Examiner* — Alesa Allgood
(74) *Attorney, Agent, or Firm* — The Webb Law Firm (57) ABSTRACT

A method for detecting an electrically conductive target in soil using a metal detector, including the steps of: processing a receive signal using at least two different functions for producing at least two processed signals, each of the processed signals is at least partly insensitive to at least one unwanted signal due to the soil or an electromagnetic interference noise; determining a noise level of each of the at least two processed signals for producing at least two noise signals; and producing, from at least one of the at least two processed signals, an indicator output signal indicative of the presence of the electrically conductive target when the electrically conducting target is within the influence of a transmit magnetic field transmitted by the metal detector; wherein the step of producing an indicator output signal is dependent upon characteristics of the at least two noise signals.

18 Claims, 4 Drawing Sheets

(56) References Cited

U.S. PATENT DOCUMENTS

2007/0296415 A1* 12/2007 Stamatescu ............ G01V 3/104
          324/326
2012/0212227 A1   8/2012 Candy
2013/0147487 A1   6/2013 Harmer

* cited by examiner

METAL DETECTOR

CROSS-REFERENCE TO RELATED APPLICATIONS

This application claims priority to Australian Provisional Patent Application No. 2013904566 filed Nov. 26, 2013, the disclosure of which is hereby incorporated in its entirety by reference.

TECHNICAL FIELD

This invention relates to metal detectors.

BACKGROUND

The general forms of most metal detectors that interrogate soils are either hand-held battery-powered units, conveyor-mounted units, or vehicle-mounted units. Examples of hand-held battery-powered units include detectors used to locate gold, explosive land mines or ordnance, coins, and treasure. Examples of conveyor-mounted units include gold detectors in ore mining operations, and an example of a vehicle-mounted unit includes a unit to locate buried landmines.

These metal detectors usually consist of transmit electronics generating a repeating transmit signal cycle, of a fundamental period, that is applied to an inductor, for example a transmit coil, which transmits a resulting alternating magnetic field, sometimes referred to as a transmit magnetic field.

These metal detectors also contain receive electronics that processes a receive signal from a measured receive magnetic field to produce an indicator signal, the indicator output at least indicating the presence of at least one metal target within the influence of the transmit magnetic field.

Advanced metal detectors often include several operating modes that are selectable by the user. Through selection of one of these operating modes, the user can optimise the detector for operation with different types of ground, for finding different types of intended targets, and attenuating the effects of different types of EMI. For example, an operating mode might be suitable for use in an area having one type of ground and to locate a particular type of target (eg small gold nuggets), but less than optimal for detection of large gold nuggets in the same type of ground. For another example, an operating mode might be suitable for use in areas having magnetic ground but not as suitable for areas having saline ground. Such variability requires that, in order to optimise the detection or prospecting process, the user should attempt to determine the nature of the ground and decide the types of targets to be sought, then select the best operating mode, prior to detecting or prospecting.

In practice, selection of the best operating mode requires prior knowledge of the ground, the targets, and also experience of the user. Further, if the ground is not homogeneous and the type of the ground changes with position within a detection zone, it becomes inconvenient for a user to adjust for the best operating mode. Even if the user somehow knows the types of ground, it is inconvenient to continually change the operating mode to suit the continually changing ground.

There is thus a need for an improved method for selecting the best operating mode, each such mode normally involving a set of one or more corresponding functions for processing a receive signal.

SUMMARY

According to a first aspect of the present invention, there is provided a method for detecting an electrically conductive target in soil including the steps of:
generating a transmit signal;
generating a transmit magnetic field for transmission into the soil based on the transmit signal;
receiving a receive magnetic field;
providing a receive signal induced by the receive magnetic field;
processing the receive signal using at least two different functions for producing at least two processed signals, each of the processed signals is at least partly insensitive to at least one unwanted signal due to the soil or an electromagnetic interference noise;
determining a noise level of each of the at least two processed signals for producing at least two noise signals; and
producing, from at least one of the at least two processed signals, an indicator output signal indicative of the presence of the electrically conductive target when the electrically conducting target is within the influence of the transmit magnetic field;
wherein the step of producing an indicator output signal is dependent upon characteristics of the at least two noise signals.

According to a second aspect of the present invention, there is provided a metal detector configured to perform the method of the first aspect.

According to a third aspect of the present invention, there is provided a computer readable medium comprising instructions for causing a processor to implement the method of the first aspect.

BRIEF DESCRIPTION OF DRAWINGS

Embodiments of the present invention will be discussed with reference to the accompanying drawings wherein.

DESCRIPTION OF EMBODIMENTS

Figure 1:
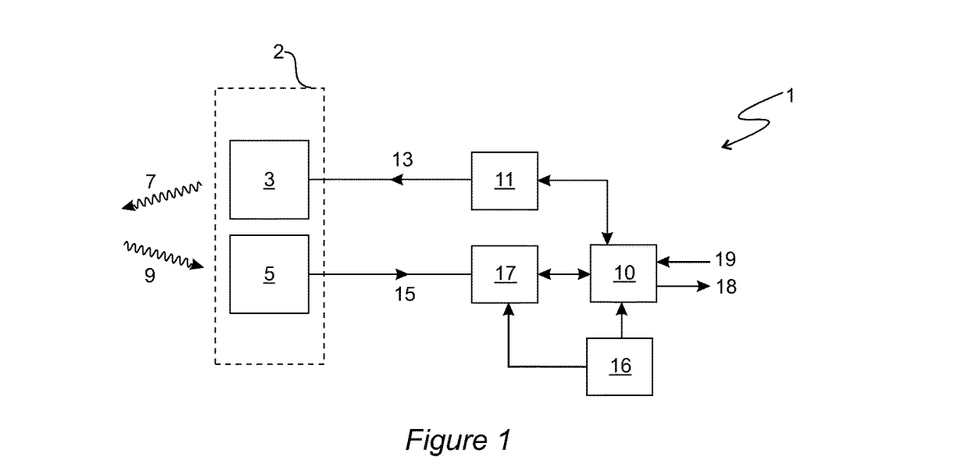
FIG. 1 depicts a functional block diagram of a metal detector.

FIG. 1 is a block diagram showing a functional block diagram 1 of one embodiment of a metal detector.

The metal detector includes a sensing head 2, which includes a magnetic field transmitter 3 and a magnetic field receiver 5. The magnetic field transmitter 3 receives a transmit signal 13, which can be a repeating transmit signal cycle, from transmit electronics 11 to transmit a transmit magnetic field 7. The magnetic field receiver 5 receives a receive magnetic field 9.

The transmitter 3 and the receiver 5 can be separate coils, or can be the same coil, within the sensing head 2. The transmitter 3 and the receiver 5 can also be in other forms and shapes of magnetic field transmitters and receivers known to a person skilled in the art.

Receive signal 15 generated by the receive magnetic field 9 received by the sensing head 2 is synchronously demodulated by one or more demodulators 17 using one or more demodulation functions whose parameters are stored in a digital storage medium 16. The received signal may be filtered (not shown) by a filtering module, or may be converted to digital form by Analogue-to-Digital Convertor (ADC) prior to the synchronous demodulation. The outputs of the one or more demodulators 17 are further processed, by a processing unit 10, to generate an indicator output signal 18 that indicates the presence of a target, if any, within the influence of the transmit magnetic field 7. Further processing may include filtering, averaging and linearly combining outputs of the demodulator. The processing unit 10 may receive instructions from an operator of the metal detector through input 19.

The data storage medium 16 stores a plurality of synchronous demodulation functions. For a time-domain detector, each function defines one or more periods or windows, with or without corresponding gain of each of the defined period or window, during which the receive signal is sampled or processed. For a frequency-domain detector, each function defines one or more periods or windows, or each function includes information regarding frequency and phase for demodulation purposes. The output of each synchronous demodulation is known as a channel.

Depending upon the synchronous demodulation functions and transmit waveform, channels produced have particular characteristics. Target channels are those produced with synchronous demodulation functions designed in order that they are sensitive to mainly resistive components of electrically conductive targets. For example, a synchronous demodulation function can be designed such that a corresponding channel is responsive to short time constant (TC) targets, or a synchronous demodulation function can be designed such that a corresponding channel is responsive to long TC targets.

Reactive channels are those produced with synchronous demodulation functions selected in order that they are responsive mainly to reactive components of objects and/or ground. Ground channels are those produced with synchronous demodulation functions selected in order that they are responsive to resistive signals from the ground. Here "reactive" is associated with energy conservation, and "resistive" with energy dissipation.

Based on a combination of a number (which can be zero) of target channels, a number (which can be zero) of reactive channels and a number (which can be zero) of ground channels, an output signal can be produced. For example, an output signal can be produced based on a linear combination of two target channels, one reactive channel and one ground channel. For another example, a ratio of two target channels produces an output signal. Various other combinations of channels can also be used to produce the output signal.

As mentioned above, synchronous demodulation functions and the corresponding transmit waveform dictate the characteristics of channels. For target channels, the corresponding synchronous demodulation functions are designed such that they are insensitive to one or more of the unwanted soil/ground signals, for example, salt signals due to saline soil and viscous remnant magnetization (VRM) signals due to viscous superparamagnetic components of magnetic soils. VRM signals can be modeled in various forms or orders. The simplest form is to model VRM signals as resistive, frequency-independent VRM signals, also known as log-uniform resistive VRM signals because of the uniform, constant representation in a magnitude versus log-frequency graph. On top of log-uniform resistive VRM signals, VRM signals can further be modeled to include higher order effects, namely, as log-linear resistive VRM signals, because of the linearly increasing or decreasing representation in a resistive magnitude versus log-frequency graph. Teaching of models for VRM signals and signals due to saline soil can be found in AU2011200515 and AU2011200516.

A synchronous demodulation function for a target channel can be, at least, inherently insensitive to a type of the soil/ground signals, but not necessarily insensitive to all types of soil signals. It is also correct to say that a synchronous demodulation function is inherently ground balanced as long as it is insensitive to at least a type, if not all, of the soil signals. In practice, further "ground balance" is performed either automatically during the operation of a metal detector, or manually prior to the operation of the metal detector, usually by slightly altering a linear combination of a target channel and either a ground channel or reactive channel to reduce spurious soil-related signals in the said target channel. The reason for this is that, while the synchronous demodulation function is inherently ground balanced, other factors including the changes in temperature of the electronics and soil may affect how well the synchronous demodulation function is balanced to the soil/ground being interrogated. Further, all soil signals include log-linear resistive signals/components. If a target channel is produced with a demodulation function that cancels only log-uniform VRM signals, variation of the ratio of log-linear resistive VRM signals to log-uniform resistive VRM signals will cause spurious signals in that target channel, possibly masking the detection of faint target signals. Accordingly, to optimise the performance of a metal detector, further "ground balance" is often required despite the fact that the synchronous demodulation functions for a target channel are inherently insensitive to the log-uniform ground signal.

It may be tempting to design the synchronous demodulation functions for targets channels such that they are insensitive to all unwanted soil signals. However, it was found that the greater the number and variety of unwanted signals being minimised in a channel, the less sensitive to sought targets that channel becomes. For example, soils, having a saline component, respond with a component of the receive signal that is similar to major components of signals from metallic objects having high characteristic frequency. A function created to eliminate the spurious signal component due to soil salinity also tends to reduce the signal from metallic objects of high characteristic frequency. In scenarios where the saline component is significant, using a function to eliminate the spurious signal component due to soil salinity, even at the expense of signal from metallic objects having high characteristic frequency, often results in improved signal-to-noise ratios. However, in scenarios where the saline component is not significant, using such a function would reduce the signal from metallic objects having high characteristic frequency without reducing the overall noise signal from the soil. In this case, a degraded signal-to-noise ratio would result.

Thus, as an example, the synchronous demodulation functions for target channels should minimise saline and log-linear resistive VRM only if both soil conditions are significantly present, otherwise targets may remain undetected due to unnecessarily reduced sensitivity.

The following are examples of effects of possible synchronous demodulation functions for target channels:

a. a synchronous demodulation function that produces a simple resistive response (e.g. to maximise a resistive signal to electronics noise ratio), that uses a reactive channel to "fine ground balance". This is well known prior art and appears commonly in single frequency metal detectors;

b. a synchronous demodulation function that produces an approximate null to environmental conductive uniform half spaces (such as a sea beach), and may use either a reactive or a ground resistive channel for "fine ground balancing";
c. a synchronous demodulation function that is balanced to log-uniform resistive VRM signals. Such a function will typically be the most sensitive to targets, but typically the most sensitive to unwanted signals from the soil, among the functions described below;
d. a synchronous demodulation function that is balanced to salt signals and log-uniform resistive VRM signals. For example, such a function will typically produce a channel which is less sensitive to targets than example a., but the channel produced will typically contain less soil signal than example a., especially when the soil is saline;
e. a synchronous demodulation function that is balanced to log-uniform resistive VRM signals and log-linear resistive VRM signals. Such a function will typically produce a channel that is less sensitive to targets than example a., but the channel produced will typically contain less soil signal than example a., especially when the VRM signals include significant log-linear resistive VRM signals;
f. a synchronous demodulation function that is balanced to signals due to saline soil, log-uniform resistive VRM signals and log-linear resistive VRM signals. Such a function will typically produce a channel which is less sensitive to targets than examples b. and c., but the channel produced will typically contain less soil signal than examples b. and c., especially when the soil is salty and the VRM signals include significant log-linear resistive VRM signals;
g. a synchronous demodulation function that is balanced to log-uniform VRM signals, log-linear resistive VRM signals and log-quadratic resistive VRM signals. Such a function will typically produce a channel which is less sensitive to targets than example d., but the channel produced will typically contain less soil signal than example a., especially when the VRM signals include significant log-linear and log-quadratic resistive VRM signals; and
h. a synchronous demodulation function with a reduced target time constant spectrum for any of the above. Whilst this reduces sensitivity to some target types, it has the advantage of reducing some types of soil signal (noise), and EMI, and this has advantages for when the user indicates target time constant range preferences.

At present, in order to choose the most suitable synchronous demodulation functions for target channels, a user needs to investigate the area to be searched, then selects the best synchronous demodulation functions from a plurality of functions previously programmed into the metal detector. A metal detector may have, for example, a function that eliminates saline signals, a function which eliminates log-uniform resistive VRM signals, and a function which eliminates log-linear resistive VRM signals. The metal detector may contain other functions which can be used to eliminate or reduce other particular spurious signals. At present the user could try each of the functions sequentially, examine the noise produced when the metal detector is swung during operation, then select the function which is likely to give the best signal-to-noise ratio taking into account the observed noise and the sensitivity of the function to metallic objects.

The present invention provides an automation of this and other similar processes of identifying and/or selecting the best function for the metal detector to use. The present invention presents a way to enable selection of the best synchronous demodulation functions, either automatically, or through interaction with the user.

In particular, a metal detector in accordance with the present invention includes a plurality of synchronous demodulation functions, for processing the receive signal to produce a plurality of target channels. The different synchronous demodulation functions have different sensitivities to various targets, or different TC ranges, and define which of the unwanted signals they reject. Examples of unwanted signals include frequency-independent resistive VRM signals, frequency-dependent resistive VRM signals, and salt signals. It should be noted that it is possible for a synchronous demodulation function to be sensitive to just one range, for example, sensitive to only high-frequency, short TC components. It is also possible for a synchronous demodulation function to have different relative sensitivities to different ranges of TC, for example, lower sensitivity to shorter TC components and higher sensitivity to longer TC components.

Each target channel is examined for noise due to the ground or EMI noise when the metal detector is swung during operation. The noise is then processed and, based upon the result, the indicator output signal is produced.

Alternatively, the target channels may be combined, and the combination examined for noise due to the ground or EMI noise when the metal detector is swung during operation. The combination is then altered, based on that noise, in such a way that the altered combination is more likely to produce lower noise due to the ground or EMI noise when the metal detector is swung during operation. This procedure may be iterated until a satisfactory result is obtained. The combination can be a function of the target channels. For example, the combination may be a linear combination of the target channels, or a linear combination of a subset of the target channels, or a mathematical function of a subset of the target channels containing one of more of the target channels.

Figure 2:
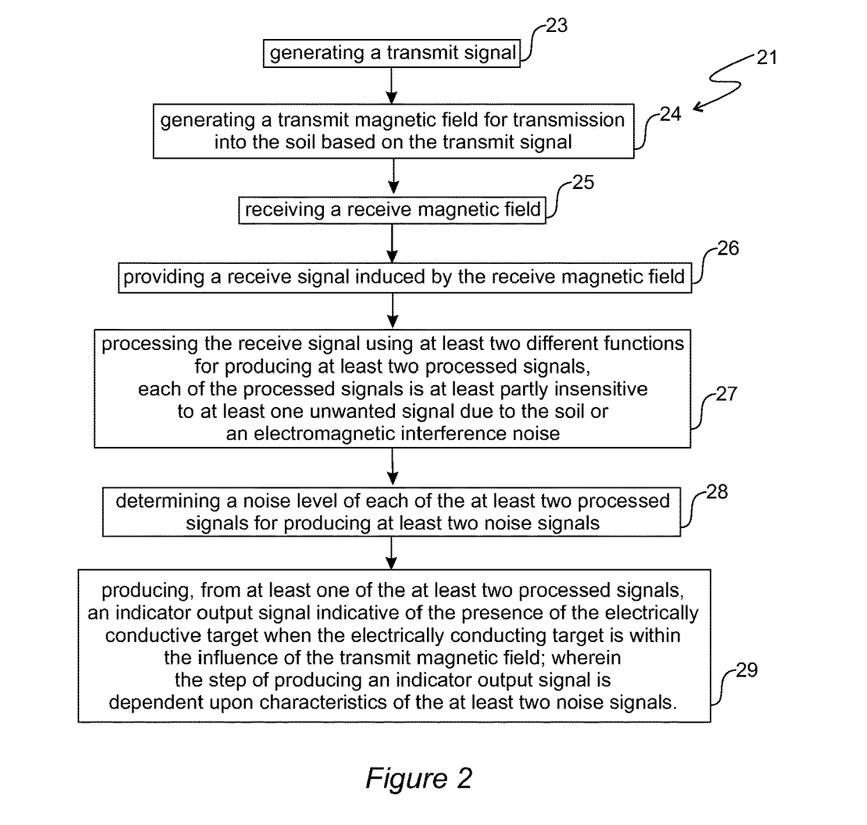
FIG. 2 depicts a broad form of the present invention.

A broad form of the present invention is depicted 21 in FIG. 2. In particular, a metal detector in accordance with this broad form generates a transmit signal 23, generates a transmit magnetic field for transmission into the soil based on the transmit signal 24, receives a receive magnetic field 25, and provides a receive signal induced by the receive magnetic field 26. The metal detector then demodulates the receive signal using at least two different functions for producing at least two processed signals, each of the processed signals being at least partly insensitive to at least one unwanted signal due to the soil or an electromagnetic interference 27. A noise level of each of the processed signals is determined for producing at least two noise signals 28 and, from at least one of the at least two processed signals, an indicator output signal, indicative of the presence of the electrically conductive target when the electrically conducting target is within the influence of the transmit magnetic field, is produced. The step of producing an indicator output signal is dependent upon characteristics of the at least two noise signals 29.

The present invention thus enables a metal detector to select the best operating mode by selecting the best function or set of functions to be used to process the receive signal based on the continuously monitored noise component of the processed receive signal. The function or set of functions can be updated in real-time, automatically.

In one embodiment, the metal detector suggests to the user which one, or group, of the synchronous demodulation functions is most suitable. It is also possible to select a particular target channel, deemed most suitable, as that to be used to produce the default output signal.

In one embodiment, a linear combination of one or more target channels, one or more reactive channels and one or more ground channels produces an output signal, the coefficients of the linear combination being based upon the results of the analysis of the noise examined in the target channels.

In one embodiment, changes of the coefficients of the linear combination are based on a hysteresis model.

In one embodiment, a plurality of synchronous demodulation functions are run simultaneously to produce n channels, where n can be a number from 2 to many. Each channel is automatically ground balanced during operation of the detector. Alternatively, it is possible to have all channels manually ground balanced simultaneously before operation. It is also possible to have some channels ground balanced automatically and others manually. This is useful when some channels are noisy enough to make automatic ground balanced necessary. For channels that are quiet, manual ground balance is better, as automatic ground balance can unnecessarily reduce the sensitivity of quiet channels. After the initial ground balancing, the output of each channel is examined for ground noise and statistics of the noise in each channel are recorded. These are used to determine the likely maximum noise that is not a target signal. The EMI noise may be examined in a similar manner. The selection of which one or more synchronous demodulation functions to be used, based on the noise statistics, may include any one, or a combination, of the selection procedures below:

a. fully automatic selection by the metal detector, without any input from the operator;
b. suggestion by the metal detector to the operator which one or more synchronous demodulation functions to select;
c. a set of one or more selected synchronous demodulation functions, with any function that is excluded from that set contributing to the output signal only when its corresponding absolute output value exceeds a threshold determined from the noise statistics; and
d. linearly combining the absolute values of the outputs of synchronous demodulation, including the noisier channels, of only those channels whose absolute values exceed a threshold determined from the noise statistics.

In a simple form of one embodiment, the noise of each target channel is measured, then the quietest channel is selected for production of the output indication. For each of those target channels that remains unselected, a threshold level is determined from the noise of the channel, such that the noise of each channel is unlikely to exceed the respective threshold. The threshold values for these channels, besides the quietest channel, may or may not be the same value. For the quietest channel, the threshold is set to zero. In this arrangement, the biggest instantaneous signal that exceeds its threshold is fed to the output. In another embodiment, the user may indicate a range of target time constant to be preferably detected or not to be detected, and the selection process is biased accordingly.

In one form, an output signal will be produced only when the threshold is exceeded or reached. Alternatively, it is possible to produce an output signal continuously based on one or more of the target channels.

In another form, channels that are specifically more sensitive to fast TC targets are scaled up compared to channels that are less sensitive when fast TC targets are sought. Similarly, if one does not want to detect fast TC targets, one would do the opposite by scaling down the channels sensitive to fast TC targets. This would, generally, produce the advantage of reducing the noise due to saline soils.

The selections of the functions, thresholds, scaling factors, or coefficients of a linear combination, may be based on the ratio of the noises or based on a complicated function.

The choices of values of the thresholds and scaling factors that are derived from the measured noise statistics may be based upon:

a. the sensitivity profiles of the various synchronous demodulation functions, that is, the calculated or measured Signal-to-Noise Ratio (S/N) versus target TC;
b. the measured noise, including soil signals and possibly EMI, of each channel; and
c. the types of targets one is seeking, e.g. fast TC landmines rather than typically longer TC iron junk, or all TCs as in gold prospecting.

Figure 3:
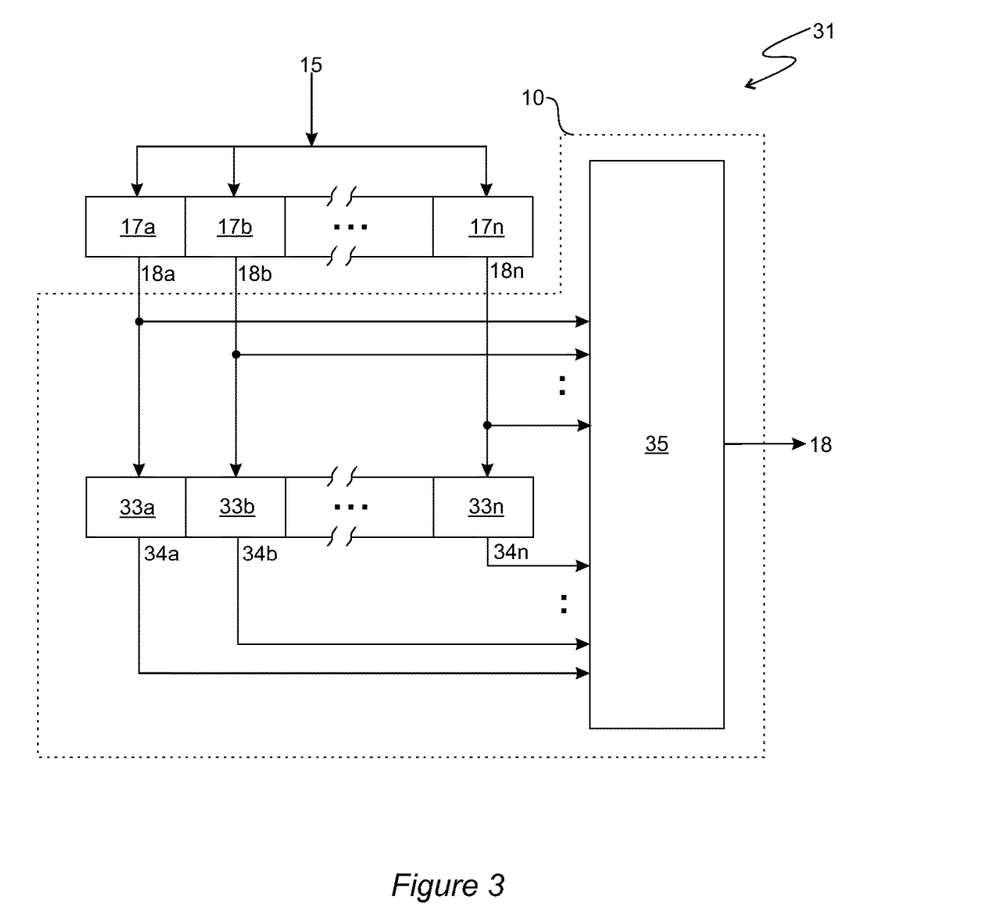
FIG. 3 depicts one embodiment of the present invention.

FIG. 3 depicts one embodiment of the present invention. In this embodiment 31, receive signal 15 is fed to a number of synchronous demodulators 17a, 17b . . . 17n, each processes receive signal 15 using a different synchronous demodulation function (not shown) to produce a plurality of target channels 18a, 18b . . . 18n. In practice, a minimum of two different functions are required to process the receive signal 15 to produce two different target channels. Reactive channels and ground channels may also be produced concurrently, but are not shown in the figure. The number of ground channels produced simultaneously is often, but not necessarily, smaller than the number of target channels, as is the number of reactive channels.

The target channels 18a, 18b . . . 18n are fed to processor 35. They are also fed to noise level detector 33a, 33b . . . 33n, respectively. Each noise detector determines the noise level of the respective target channel. The determined noise levels 34a, 34b . . . 34n of each target channel are then fed to processor 35. Based on the determined noise levels 34a, 34b . . . 34n, target channels 18a, 18b . . . 18n are processed to produce indicator output signal 18.

Figure 4:
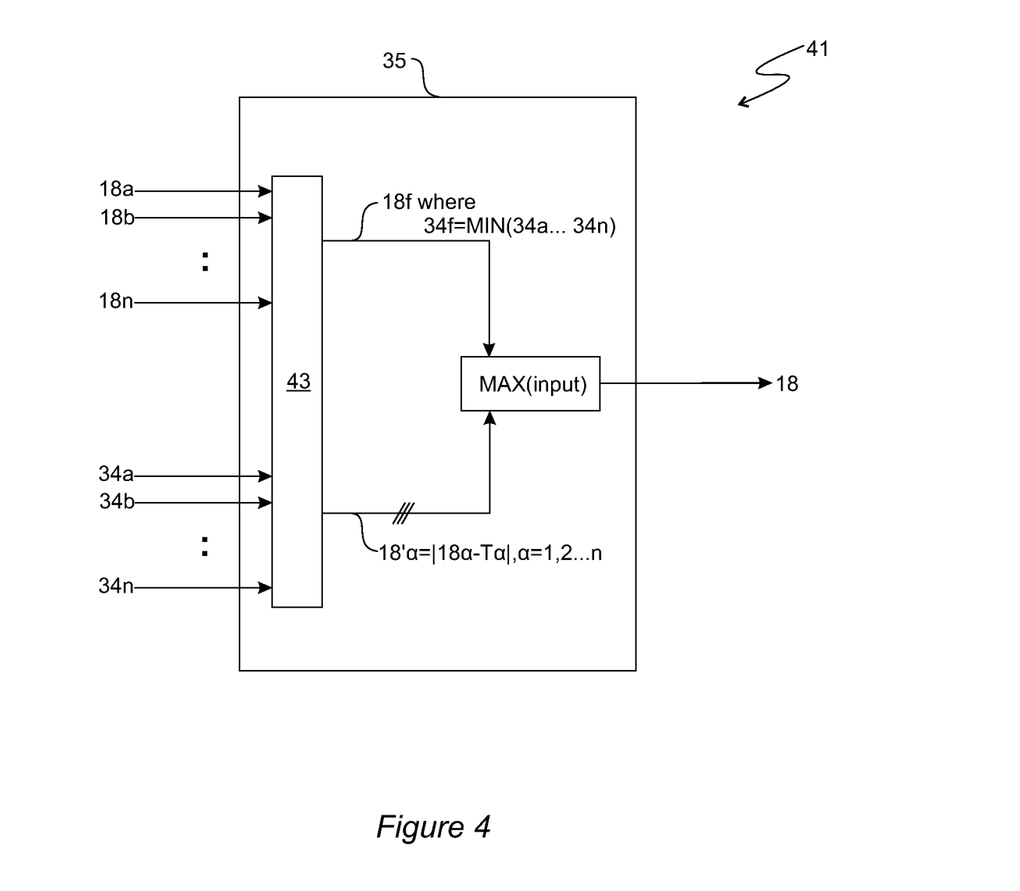
FIG. 4 depicts one way of processing a set of multiple target channels.

FIG. 4 depicts one such method 41 of processing the target channels 18a, 18b . . . 18n and the determined noise levels 34a, 34b . . . 34n within processor 35. As shown, a computational unit 43 within the processor 35 determines that noise 34f is the least of the individually measured noise 34a, 34b . . . 34n and, accordingly, emits the target channel 8f, which is one of 18a, 18b . . . 18n, for further processing on the path to producing the indicator output.

The computational unit 43 also produces a modified channel $$18'_\alpha = \begin{vmatrix} |18_\alpha - T_\alpha| & \text{when } |18_\alpha| > T_\alpha \\ 0 & \text{when } 18_\alpha < T_\alpha \end{vmatrix} \cdots$$

where
$\alpha \in 1, 2, \ldots n$;
$T_\alpha$=Threshold of $18_\alpha$

If, for example, the output, produced by computational unit 43, of $18'_\alpha$ is then used as the indicator output signal 18.

In a more elaborate form, the process by which the level of the output indicator is determined could involve a series of steps, including digitisation of the output of the receive preamplifier, with a number of channels produced by a number of digital synchronous demodulations of the output of the preamplifier, or equivalent synchronous demodulation of the output of the receive preamplifier, followed by digitisation of the produced channels, both systems producing a number of ground balanced target channels. The noise, including residual ground noise, of each resultant target channels is measured over some period, perhaps with some means of determining when the coil is being moved over the surface of ground so as to ensure that the measurements taken include any residual noise from the ground.

The channel, $C_\alpha$, having the lowest measured noise, $N_\alpha$, is selected as having its threshold set to zero, making it the default channel for output indication. Each of the remaining target channels, $C_\beta$ where $\beta \neq \alpha$, has a threshold, $T_\beta$, calculated from its noise. During normal operation of the detector, modified outputs $Y_\beta$ produced from the subtraction of the thresholds $T_\beta$ from their respective channels $C_\beta$. The thresholds are set so as to make it unlikely that any of the modified outputs $Y_\beta$ are greater than the zero threshold of the default channel, $C_\alpha$, implying that the output indication is generally from the default channel, whereas for it to be from another channel, that channel must exceed the value of the $C_\alpha$, channel by its threshold $T_\beta$.

Alternatively, the threshold levels may be lowered by an operator so that sometimes the noise from the noisier channels may exceed the typical background noise of the absolute value of channel $C_\alpha$. This mode may be chosen if, for example, it is likely that targets, or a particular target being sought, are likely to produce a larger signal in channels other than the quietest channel $C_\alpha$.

Instead of subtracting a threshold based upon the noise of the absolute values of the channels, the channels may be scaled using scaling factors based upon the noise of each channel, that the quietest channel $C_\alpha$, has a scaling factor of say unity (=1); the noisier each of the other channels is, the smaller the scaling factor (<1), to produce second modified outputs $Y_\beta'$=scaling factor $Y_\beta \times$channel $Y_\beta$ with the quietest channel $C_\alpha$ having a scaling factor of 1 so that the typical noise of each of the scaled outputs is similar. Then the largest instantaneous absolute value of the second modified outputs $Y_\beta'$ is fed to control the indicator.

Figure 5:
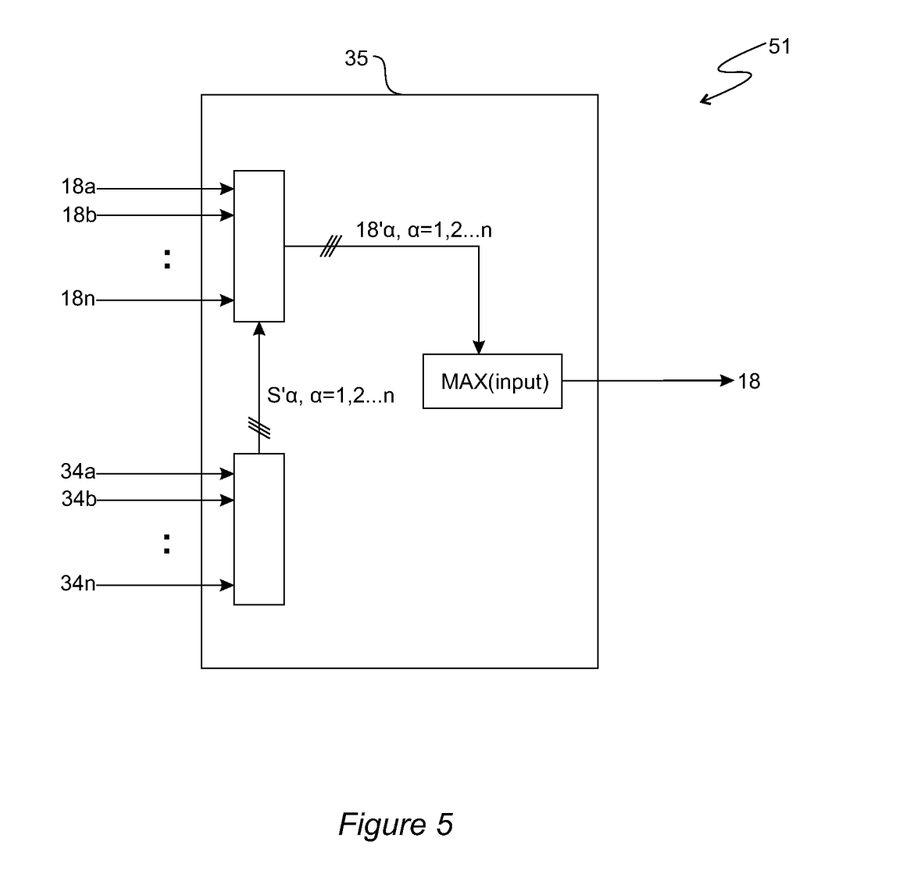
FIG. 5 depicts another way of processing a set of multiple target channels using scaling factors.

FIG. 5 depicts 51 processing the n target channels 18a, 18b . . . 18n and the determined respective noise levels 34a, 34b . . . 34n within processor 35 using scaling factors. In this embodiment, the determined noise levels 34a, 34b . . . 34n are used to produce scaling factors $S'_\alpha$, $\alpha$=1, 2 . . . n for their corresponding target channels 18a, 18b . . . 18n. The produced scaling factors $S'_\alpha$, $\alpha$=1, 2 . . . n are then multiplied with their corresponding target channels 18a, 18b . . . 18n to produce modified channels $18'_\alpha$, $\alpha$=1, 2 . . . n. The modified channel 18'f having the largest value is then selected to produce output 18.

Alternatively, a linear combination of absolute values of the second modified outputs $Y_\beta'$ is used to produce a type of indicator output signal instead of selecting the largest instantaneous absolute value of second modified outputs $Y_\beta'$. In one form, the second modified output $Y_\beta'$ is fed as an audio output as a form of the indicator output signal.

Examples of various possible ways to utilise scaling factors, threshold values and linear combination to achieve desirable results include, but are not limited to:

a. determining at least two scaling factors, each based on at least one of the at least two noise signals; determining at least two threshold values, each based on at least one of the at least two noise signals; multiplying each of the at least two scaling factors with a different one of the at least two processed signals to provide at least two partially modified processed signals; subtracting each of the at least two threshold values from an absolute value of a different one of the at least two partially processed signals to provide at least two modified processed signals; and selecting that modified processed signal having the largest magnitude as the indicator output signal;

b. determining at least two scaling factors, each based on at least one of the at least two noise signals; determining at least two threshold values, each based on at least one of the at least two noise signals; subtracting each of the at least two threshold values from an absolute value of a different one of the at least two processed signals to provide at least two partially modified processed signals; multiplying each of the at least two scaling factors with a different one of the at least two partially processed signals to provide at least two modified processed signals; selecting one of the at least two modified processed signals with a largest magnitude as the indicator output signal;

c. determining at least two threshold values, each based on at least one of the at least two noise signals; subtracting each of the at least two threshold values from an absolute value of a different one of the at least two processed signals to provide at least two modified processed signals; and linearly combining the at least two modified processed signals as the indicator output signal, with coefficients dependent upon that modified processed signal having the largest magnitude;

d. determining at least two scaling factors, each based on at least one of the at least two noise signals; multiplying each of the at least two scaling factors with a different one of the at least two processed signals to provide at least two modified processed signals; and linearly combining the at least two modified processed signals as the indicator output signal, with coefficients dependent on that modified processed signal having the largest magnitude;

e. determining at least two scaling factors, each based on at least one of the at least two noise signals; determining at least two threshold values, each based on at least one of the at least two noise signals; multiplying each of the at least two scaling factors with a different one of the at least two processed signals to provide at least two partially modified processed signals; subtracting each of the at least two threshold values from an absolute value of a different one of the at least two partially processed signals to provide at least two modified processed signals; and linearly combining the at least two modified processed signals as the indicator output signal, with coefficients dependent upon that modified processed signal having the largest magnitude;

f. determining at least two scaling factors, each based on at least one of the at least two noise signals; determining at least two threshold values, each based on at least one of the at least two noise signals; subtracting each of the at least two threshold values from an absolute value of a different one of the at least two processed signals to provide at least two partially modified processed signals; multiplying each of the at least two scaling factors with a different one of the at least two partially processed signals to provide at least two modified processed signals; and linearly combining the at least two modified processed signals as the indicator output signal, with coefficients dependent upon that modified processed signal having the largest magnitude;

g. determining at least two threshold values, each based on at least one of the at least two noise signals; subtracting each of the at least two threshold values from an absolute value of a different one of the at least two processed signals to provide at least two modified processed signals; and linearly combining, with predetermined coefficients, the at least two modified processed signals as the indicator output signal;

h. determining at least two scaling factors, each based on at least one of the at least two noise signals; multiplying each of the at least two scaling factors with a different one of the at least two processed signals to provide at least two modified processed signals; and linearly combining, with predetermined coefficients, the at least two modified processed signals as the signal used to produce the indicator output signal;

i. determining at least two scaling factors, each based on at least one of the at least two noise signals; determining at least two threshold values, each based on at least one of the at least two noise signals; multiplying each of the at least two scaling factors with a different one of the at least two processed signals to provide at least two partially modified processed signals; subtracting each of the at least two threshold values from an absolute value of a different one of the at least two partially processed signals to provide at least two modified processed signals; and linearly combining, with predetermined coefficients, the at least two modified processed signals as the signal used to produce the indicator output signal; and j. determining at least two scaling factors, each based on at least one of the at least two noise signals; determining at least two threshold values, each based on at least one of the at least two noise signals; subtracting each of the at least two threshold values from an absolute value of a different one of the at least two processed signals to provide at least two partially modified processed signals; multiplying each of the at least two scaling factors with a different one of the at least two partially processed signals to provide at least two modified processed signals; and linearly combining, with predetermined coefficients, the at least two modified processed signals as the signal used to produce the indicator output signal.

It is also possible to use other algorithms that select channel outputs or linear combinations of channels so that the noisier channels are less likely to be selected to produce an indicator output signal. However, a function of a particular channel with a higher likelihood of producing a larger signal from sought targets would be more likely to be selected to produce the output indication.

The analysis of noise of the channels may be some sort of statistical analysis of the noise; eg estimation of the median noise of each noise signal, or the peak-to-peak value of the noise.

In yet another embodiment:

a. knowing the sensitivity of each of the synchronous demodulation functions to various unwanted signals, for example, signals due to saline soil, log-linear resistive VRM signals, and log-uniform resistive VRM signals, only one channel with a corresponding function that is likely to give the best target S/N with respect to the ground noise is selected as default channel;

b. the quieter channels among those that are noisier than the one channel likely to have the best S/N, if any, are emitted when their absolute value exceeds the absolute value of the default channel;

c. a comparatively noisier channel is emitted only when its absolute value minus its specific threshold exceeds the absolute value of the default channel, with the threshold for each channel being based upon the soil noise statistics of each channel, recorded to assess the likely maximum noise not due a target; and d. the default channel, which may or may not require further processing, is selected for generation of the indicating output. It is also possible to select a different other channel for generation of the output when it exceeds the requirements for selection. The indicator output can be through audio output or visual means.

Alternatively, the noise statistics of all the channels may be indicated on a visual display and the user may select the default channel, or select the default channel plus any other channels that are then used to produce the indicator output when their absolute values, minus a respective threshold for each channel, exceed the absolute value of the default channel.

The term "soil" and "ground" are used interchangeably in this specification and they mean the same as understood by a person skilled in the art.

Those of skill in the art would understand that information and signals may be represented using any of a variety of technologies and techniques. For example, data, instructions, commands, information, signals, bits, symbols, and chips that are referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgment of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A method for detecting an electrically conductive target in soil including the steps of:
    generating a transmit signal;
    generating a transmit magnetic field for transmission into the soil based on the transmit signal;
    receiving a receive magnetic field;
    providing a receive signal induced by the receive magnetic field;
    processing the receive signal using at least two different demodulation functions for producing at least two processed signals, each of the processed signals is at least partly insensitive to at least one unwanted signal due to the soil or an electromagnetic interference noise, wherein the at least two different demodulation functions cause noises in the at least two processed signals to be different;
    determining a noise level of each of the at least two processed signals for producing at least two different noise signals representing the different noises or different combinations of noises; and
    producing, from at least one of the at least two processed signals, an indicator output signal indicative of the presence of the electrically conductive target when the electrically conducting target is within the influence of the transmit magnetic field;
    wherein the electrically conductive target, within the influence of the transmit magnetic field, produces resistive components associated with energy dissipation;
    wherein the step of producing an indicator output signal is dependent upon characteristics of the at least two noise signals to avoid cancelling all unwanted signals to improve a sensitivity of a detection of the electrically conductive target;
    wherein each of the at least two different demodulation functions is configured so that the at least two processed signals are sensitive to the resistive components of the electrically conductive target, at least partly insensitive to at least one type of components of soil signal, and that the at least two processed signals differ in their sensitivities to the at least one type of components of soil signal; and
    wherein the at least two different demodulation functions comprise at least two of the following: a function that is balanced to log-uniform resistive viscous remnant magnetization (VRM) signals, a function that is balanced to salt signals, a function that is balanced to log-linear resistive VRM signals.

2. The method of claim 1, wherein the noise level of each of the at least two processed signals is measured over a period of time.

3. The method of claim 1, wherein the at least two different demodulation functions are predetermined prior to the step of processing the receive signal.

4. The method of claim 1, further including the step of:
    selecting a type of the electrically conductive target to be detected;
    wherein the step of producing an indicator output signal is further dependent upon the selected type of the electrically conductive target.

5. The method of claim 1, wherein the step of producing the indicator output signal from the at least two processed signals includes the steps of:
    determining at least two threshold values, each based on at least one of the at least two noise signals;
    subtracting each of the at least two threshold values from an absolute value of a different one of the at least two processed signals to provide at least two modified processed signals; and
    producing the indicator output signal based on: selecting one of the at least two modified processed signals with a largest magnitude as the indicator output signal, or linearly combining the at least two modified processed signals as the indicator output signal, with coefficients dependent on one of the at least two modified processed signals with a largest magnitude, or linearly combining, with predetermined coefficients, the at least two modified processed signals.

6. The method of claim 1, wherein the step of producing the indicator output signal from the at least two processed signals includes the steps of:
    determining at least two scaling factors, each based on at least one of the at least two noise signals;
    multiplying each of the at least two scaling factors with a different one of the at least two processed signals to provide at least two modified processed signals; and
    producing the indicator output signal based on: selecting one of the at least two modified processed signals with a largest magnitude as the indicator output signal, or linearly combining the at least two modified processed signals as the indicator output signal, with coefficients dependent on one of the at least two modified processed signals with a largest magnitude, or linearly combining, with predetermined coefficients, the at least two modified processed signals.

7. The method of claim 1, wherein the step of producing the indicator output signal from the at least two processed signals includes the steps of:
    determining at least two scaling factors, each based on at least one of the at least two noise signals;
    determining at least two threshold values, each based on at least one of the at least two noise signals;
    multiplying each of the at least two scaling factors with a different one of the at least two processed signals to provide at least two partially modified processed signals;
    subtracting each of the at least two threshold values from an absolute value of a different one of the at least two partially processed signals to provide at least two modified processed signals; and producing the indicator output signal based on: selecting one of the at least two modified processed signals with a largest magnitude as the indicator output signal, or linearly combining the at least two modified processed signals as the indicator output signal, with coefficients dependent on one of the at least two modified processed signals with a largest magnitude, or linearly combining, with predetermined coefficients, the at least two modified processed signals.

8. The method of claim 1, wherein the step of producing the indicator output signal from the at least two processed signals includes the steps of:
   determining at least two scaling factors, each based on at least one of the at least two noise signals;
   determining at least two threshold values, each based on at least one of the at least two noise signals;
   subtracting each of the at least two threshold values from an absolute value of a different one of the at least two processed signals to provide at least two partially modified processed signals;
   multiplying each of the at least two scaling factors with a different one of the at least two partially processed signals to provide at least two modified processed signals; and
   producing the indicator output signal based on: selecting one of the at least two modified processed signals with a largest magnitude as the indicator output signal, or linearly combining the at least two modified processed signals as the indicator output signal, with coefficients dependent on one of the at least two modified processed signals with a largest magnitude, or linearly combining, with predetermined coefficients, the at least two modified processed signals.

9. The method of claim 1, wherein producing the indicator output signal from the at least two processed signals includes the step of:
   synchronously demodulating the receive signal using at least two synchronous demodulation functions.

10. The method of claim 1, wherein producing the indicator output signal from the at least two processed signals includes the step of:
   sampling the receive signal using at least two time demodulation functions, each time function defining one or more sampling periods.

11. The method of claim 1, wherein at least one of the at least two noise signals includes a noise signal due to the soil.

12. The method of claim 1, wherein at least one of the at least two noise signals includes an electromagnetic interference noise signal.

13. The method of claim 1, wherein each of the at least two processed signals is a target channel.

14. The method of claim 1, further including the step of:
   selecting a range of target time constant to be detected or excluded;
   wherein the step of producing an indicator output signal is further dependent upon the selected range of target time constant.

15. A metal detector configured to perform the method of claim 1.

16. A computer readable medium comprising instructions for causing a processor to implement the method of claim 1.

17. The method of claim 1, wherein the step of producing the indicator output signal from the at least two processed signals includes the step of:
   linearly combining the at least two processed signals.

18. The method of claim 17, wherein the step of linearly combining the at least two processed signals includes an iterative process until a certain criterion is met, the iterative process includes:
   linearly combining the at least two processed signals using a set of coefficients for the linear combination;
   measuring a noise of the combined signal;
   updating the set of a set of coefficients for the linear combination.

* * * * *